United States Patent
Zeng (10) Patent No.: US 6,603,123 B1
(45) Date of Patent: Aug. 5, 2003

(54) CORRECTION FOR DEPTH-DEPENDENT SENSITIVITY IN ROTATING SLAT-COLLIMATED GAMMA CAMERA

(75) Inventor: Gengsheng Lawrence Zeng, Sandy, UT (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/708,960

(22) Filed: Nov. 8, 2000

(51) Int. Cl.⁷ .............................................. G06T 1/166
(52) U.S. Cl. ................................ 250/363.1; 250/363.04
(58) Field of Search .......................... 250/363.1, 363.04; 378/147

(56) References Cited

U.S. PATENT DOCUMENTS

| | | | |
|---|---|---|---|
| 3,852,603 A | 12/1974 | Muehllehner | 250/269 |
| 3,936,639 A | 2/1976 | Barrett | 250/369 |
| 4,090,080 A | 5/1978 | Tosswill | 250/366 |
| 4,262,207 A | 4/1981 | Tosswill | 250/363.1 |
| 4,264,824 A * | 4/1981 | Tosswill | 378/147 |
| 4,419,585 A * | 12/1983 | Strauss et al. | 250/363.1 |
| 4,563,583 A * | 1/1986 | Hattori | 250/363.1 |
| 4,982,096 A | 1/1991 | Fujii et al. | 250/367 |
| 5,077,770 A | 12/1991 | Sammon | 378/101 |
| 5,519,222 A | 5/1996 | Besett | 250/363.04 |
| 5,841,141 A | 11/1998 | Gullberg et al. | 250/363.04 |
| 5,967,983 A | 10/1999 | Ashburn | 600/436 |
| 5,991,357 A | 11/1999 | Marcovici et al. | 378/19 |
| 6,046,454 A | 4/2000 | Lingren et al. | 250/370.01 |
| 6,055,450 A | 4/2000 | Ashburn | 600/431 |
| 6,091,070 A | 7/2000 | Lingren et al. | 250/370.09 |

FOREIGN PATENT DOCUMENTS

| | | |
|---|---|---|
| EP | 1 008 865 | 6/2000 |
| WO | WO 98/16852 | 4/1998 |

OTHER PUBLICATIONS

G.L. Zeng, et al. "Eigen Analysis of Cone–Beam Scanning Geometries." *Three–Dimensional Image Reconstruction in Radiation and Nuclear Medicine* © 1996 by Kluwer Academic Publishers, Netherlands. pp. 75–86.

G.L. Zeng, et al., "A cone beam tomography algorithm for orthogonal circle–and–line orbit." *Phys. Med. Biol.*, 1992, vol. 37, No. 3, 563–577.

S. Webb, et al., "Monte Carlo modelling of the performance of a rotating slit–collimator for improved planar gamma–camera imaging," *Phys. Med. Biol.*, vol. 37, No. 5, 1095–1108, 1992.

Mauderli, et al., A Computerized Rotating Laminar Radionuclide Camera, *J. Nucl. Med*, 20:341–344 (1979).

Entine, et al., "Cadmium Telluride Gamma Camera," *IEEE Transactions on Nuclear Science*, vol. NS–26, No. 1:552–558 (1979).

Urie, et al., "Rotating Laminar Emission Camera with GE–detector," *Med. Phys.* 8(6):865–870 (1981).

Mauderli, et al., "Rotating Laminar Emission Camera with GE–Detector: An Analysis," *Med. Phys.* 8(6):871–876 (1981).

Malm, et al., "A Germanium Laminar Emission Camera," *IEEE Transactions on Nuclear Science*, vol. NS–29, No. 1:465–468 (1982).

Mauderli, et al., "Rotating Laminar Emission Camera with GE–Detector: Further Developments," *Med. Phys.* 14(6):1027–1031 (1987).

\* cited by examiner

*Primary Examiner*—Constantine Hannaher
*Assistant Examiner*—Shun Lee
(74) *Attorney, Agent, or Firm*—Fay, Sharpe, Fagan, Minnich & McKee, LLP (57) ABSTRACT

A rotating laminar emission camera is provided. The camera includes a detector having a side which detects radiation facing an object being studied. The detector rotates about a central axis (109) perpendicular to the side of the detector facing the object. A collimator (100) constructed of a radiation attenuative material is arranged on the side of the detector facing the object. The collimator (100) including a plurality of spaced apart slats (102) which are tilted at an angle a greater than zero with respect to the axis (109).

23 Claims, 6 Drawing Sheets

CORRECTION FOR DEPTH-DEPENDENT SENSITIVITY IN ROTATING SLAT-COLLIMATED GAMMA CAMERA

BACKGROUND OF THE INVENTION

The present invention relates to the art of nuclear medical imaging. It finds particular application in conjunction with rotating one-dimensional (1D) slat-collimated gamma cameras and single photon emission computed tomography (SPECT), and will be described with particular reference thereto. However, it is to be appreciated that the present invention is also amenable to other like applications and other diagnostic imaging modes such as, e.g., positron emission tomography (PET).

In diagnostic nuclear imaging, one or more radiation detectors are mounted on a movable gantry to view an examination region which receives a subject therein. Typically, one or more radiopharmaceuticals or radioisotopes such as $^{99m}$Tc or $^{18}$F-Fluorodeoxyglucose (FDG) capable of generating emission radiation are introduced into the subject. The radioisotope preferably travels to an organ of interest whose image is to be produced. The detectors scan the subject along a selected path or scanning trajectory and radiation events are detected on each detector.

In a traditional scintillation detector, the detector includes a scintillation crystal that is viewed by an array of photomultiplier tubes. A collimator which includes a grid- or honeycomb-like array of radiation absorbent material is located between the scintillation crystal and limits the angle of acceptance of radiation which will be received by the scintillation crystal. The relative outputs of the photomultiplier tubes are processed and corrected to generate an output signal indicative of the position and energy of the detected radiation. The radiation data is then reconstructed into an image representation of a region of interest.

A so-called rotating laminar emission camera ("ROLEC"), also know as the rotating laminar radionuclide camera, has been disclosed in the literature and prior art. Devices utilizing a cadmium telluride (CdTe) detector arrangement have been disclosed in Mauderli, et al., A Computerized Rotating Laminar Radionuclide Camera, J. Nucl. Med 20: 341–344 (1979) and Entine, et al., Cadmium Telluride Gamma Camera, IEEE Transactions on Nuclear Science, Vol. NS-26, No. 1: 552–558 (1979). According to one version, the device included a linear array of CdTe detectors separated by tungsten plates. The plates were arranged perpendicular to the detector faces and confined the field of view of each detector to one dimension. The device had a square (approximately 4 cm×4 cm) active area, although a circular lead mask reduced the active area to 13.2 cm². The detectors, which had platinum-film electrodes, were attached to copper strips on a printed circuit board that also served as the base of the collimator and as a support for amplifier-discriminator circuits.

A ROLEC having a 250 mm×250 mm active area was disclosed in U.S. Pat. No. 4,090,080 to Tosswill, issued May 16, 1978, incorporated by reference herein, in its entirety. The device included scintillating plastic sheets disposed between parallel collimator plates supported by a steel frame in a perpendicular orientation with respect to the radiation receiving face of the detector. Fiber optics epoxied to the rear surface of each scintillating sheet transferred light generated in the each of the detectors to a corresponding photomultiplier. According to Tosswill, the ROLEC may be operated moving its axis along another curved or other configuration or without rotation, with symmetry preferred but not essential.

Devices using a segmented germanium crystal have been described by Urie, et al., Rotating Laminar Emission Camera with GE-detector, Med. Phys. 8(6): 865–870 (1981); 20 Mauderli, et al., Rotating Laminar Emission Camera with GE-Detector: An Analysis, Med. Phys. 8(6): 871–876 (1981); Malm, et al., A Germanium Laminar Emission Camera, IEEE Transactions on Nuclear Science, Vol. NS-29, No. 1: 465–468 (1982); and Mauderli, et al., Rotating Laminar Emission Camera with GE-detector: Further Developments, Med. Phys. 14(6): 1027–1031 (1987).

In a first version, a 11.5 mm thick, 45 mm×45 mm segmented germanium detector was placed behind parallel tungsten plates oriented perpendicular to the face of the detector. The crystal was segmented to form a plurality of channels, with the plates aligned with the segmentations. A 4.5 cm diameter viewing aperture was located between the detector and the activity source. Projection data acquired at multiple angular orientations as the detector-collimator assembly was rotated about its center was mathematically reconstructed to form a two-dimensional (2D) image of the activity distribution.

A second version simulated a 195 mm×195 mm detection area using five germanium blocks having a total length of 250 mm segmented into distinct electrical channels. The detector was translated linearly in a direction perpendicular to the plane of the plates to simulate a full-size detector.

While maintaining certain advantages, such as a better sensitivity-resolution compromise, over, e.g., traditional Anger cameras, the previously developed ROLECs are burdened by some other undesirable limitations. For example, the type of one dimensional collimation or slat geometry used by ROLECs presents issues with the image reconstruction. In particular, the ROLEC geometry results in a plane integral reconstruction problem as opposed to the line integral reconstruction problem that is generally encountered in traditional Anger camera applications. Moreover, the geometry produces a plane integral only in a first approximation.

In actuality, the plane integral should have a weighting factor introduced thereto to account for the fact that a detector's sensitivity has a 1/r dependence to an object being imaged, where r represents the distance of a radiation event under consideration to the detector. That is to say, the detector is generally more sensitive to relatively close objects and less sensitive to far away objects. Previously developed ROLECs merely disregard or ignore the 1/r weighting factor in solving the reconstruction problem. In previously developed ROLECs, the first approximation is merely accepted, i.e., it is accepted that the geometry produces plane integrals without 1/r weighting. Ultimately, failure to model this 1/r weighting factor or dependence, or improperly modeling the same, reduces the quality of images produced.

Additionally, while ROLECs have the advantage of relatively higher efficiency and spatial resolution, they have been expensive to produce inasmuch as significant quantities of relatively expensive detector material have been required. Although detector material cost can be reduced by using a number of relatively smaller detector segments, such an approach complicates the manufacturing process and requires that variations in the response of the individual segments be considered. Still another drawback is that the collimator slat length has been equal to the detector field of view. This undesirably results in: additional detector, collimator, and structural materials being used; introduction of spurious counts which do not contribute to useful image information; and, additional mass and bulk being incorporated into a rotating structure.

The issues raised in the foregoing paragraph have been addressed, at least in part, by developing a ROLEC which utilizes a detector area which is small compared to the length of the collimator slats. See, e.g., commonly owned U.S. patent application Ser. No. 09/206,508 of Gagnon, et al., filed Dec. 7, 1998, incorporated by reference herein, in its entirety. However, when the detector area is small compared to the length of the collimator slats, the 1/r weighting issue is exacerbated.

The present invention contemplates a new and improved ROLEC and reconstruction technique therefor which overcomes the above-referenced problems and others.

SUMMARY OF THE INVENTION

In accordance with one aspect of the present invention, a rotating laminar emission camera includes a detector having a side which detects radiation facing an object being studied. The detector rotates about a central axis perpendicular to the side of the detector facing the object. A collimator constructed of a radiation attenuative material is arranged on the side of the detector facing the object. The collimator including a plurality of spaced apart slats which are tilted at an angle greater than zero with respect to the axis.

In accordance with a more limited aspect of the present invention, the tilt angle of the slats is inversely proportional to the camera's resolution.

In accordance with a more limited aspect of the present invention, the tilt angle of the slats is greater than zero degrees and less than or equal to 5 degrees.

In accordance with a more limited aspect of the present invention, the tilt angle of the slats is approximately 0.25 degrees.

In accordance with a more limited aspect of the present invention, the slats are thin rectangular members with two rounded corners at opposing longitudinal ends of each slat. The two rounded corner are opposite an edge of the slats proximal to the side of the detector facing the object.

In accordance with a more limited aspect of the present invention, the two rounded corners have a radius of curvature approximately equal to a height of the slats, where the height of the slats is defined by a distance that the slats extend outwardly from the side of the detector facing the object.

In accordance with a more limited aspect of the present invention, the slats extend longitudinally beyond an outer dimension of the side of the detector facing the object.

In accordance with a more limited aspect of the present invention, the detector includes a plurality of detector segments which are arranged to be visible through the slats of the collimator such that each detector segment detects radiation received through a respective gap formed by adjacent slats.

In accordance with a more limited aspect of the present invention, the slats extend longitudinally beyond an outer dimension of the detector segments.

In accordance with a more limited aspect of the present invention, the slats are parallel to one another.

In accordance with a more limited aspect of the present invention, the tilt angle of the slats progressively changes for each slat.

In accordance with another aspect of the present invention, a nuclear medical imaging apparatus includes a receiving region wherein an object being imaged is received, and a radiation detector having a side which faces the receiving region. The detector includes a collimator fabricated from radiation attenuative material arranged on the front thereof between the detector and the receiving region. The collimator is made up of a plurality of spaced apart slats which are tilted at an angle greater than zero with respect to a central axis perpendicular to the side of the detector which faces the receiving region. A drive imparts about the central axis relative rotation between the detector and the object being imaged.

In accordance with a more limited aspect of the present invention, the nuclear medical imaging apparatus further includes image reconstruction means employing a Radon transformation to reconstruct an image representation of the object from data corresponding to radiation detected by the detector. The image reconstruction means approximates a first derivative of the Radon transformation by subtracting from data acquired at a first relative rotational orientation between the detector and the object, data acquired at a second relative rotational orientation between the detector and the object. The first and second relative rotational orientations are 180 degrees apart.

In accordance with a more limited aspect of the present invention, the slats are thin rectangular members with two rounded corners at opposing longitudinal ends of each slat. The two rounded corner are opposite an edge of the slats proximal to the side of the detector facing the receiving region.

In accordance with a more limited aspect of the present invention, the slats extend beyond an outer dimension of the side of the detector which faces the receiving region.

In accordance with a more limited aspect of the present invention, the radiation detector includes a plurality of detector segments which are arranged between the slats of the collimator such that each detector segment detects radiation received through a respective gap formed by adjacent slats.

In accordance with another aspect of the present invention, a method of nuclear medical imaging includes exposing a side of a radiation detector to an object being imaged such that a direction the detector is facing is defined by an axis perpendicular to the side of the detector. The method further includes varying about the axis a relative rotational orientation between the object and the detector. A first data set is obtained based on radiation detected by the detector at a first relative rotational orientation between the object and the detector, and likewise a second data set is obtained based on radiation detected by the detector at a second relative rotational orientation between the object and the detector. The second relative rotational orientation is displayed from the first relative rotational orientation. Finally, the second data set is subtracted from the first data set to determine a difference between the first and second data sets.

In accordance with a more limited aspect of the present invention, the first and second relative rotational orientations are displayed from one another by 180 degrees.

In accordance with a more limited aspect of the present invention, the difference obtained is used as an approximation of a first derivative of a Radon transformation.

In accordance with a more limited aspect of the present invention, the method of nuclear medical imaging further includes taking a derivative of the difference obtained, and backprojecting the derivative of the difference.

In accordance with a more limited aspect of the present invention, the first and second data sets represent 1/r weighted planar integrals, where r represents a distance from a detected radiation event to the detector.

In accordance with a more limited aspect of the present invention, the first and second data sets are obtained in such a manner that the 1/r weighting factor becomes negligible when the difference is obtained.

In accordance with a more limited aspect of the present invention, the method of nuclear medical imaging further includes collimating radiation received by the detector such that radiation received by the detector is substantially limited along one direction to a reception trajectory having an angle greater than zero with respect to the axis.

One advantage of the present invention is high image quality resulting from proper modeling of the measured radiation data.

Another advantage of the present invention is an improved resolution-sensitivity compromise compared to traditional Anger cameras.

Yet another advantage of the present invention is accurate reconstruction of a local region within the detector's field of view without radioactivities in outside regions affecting the image values in the particular local region.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
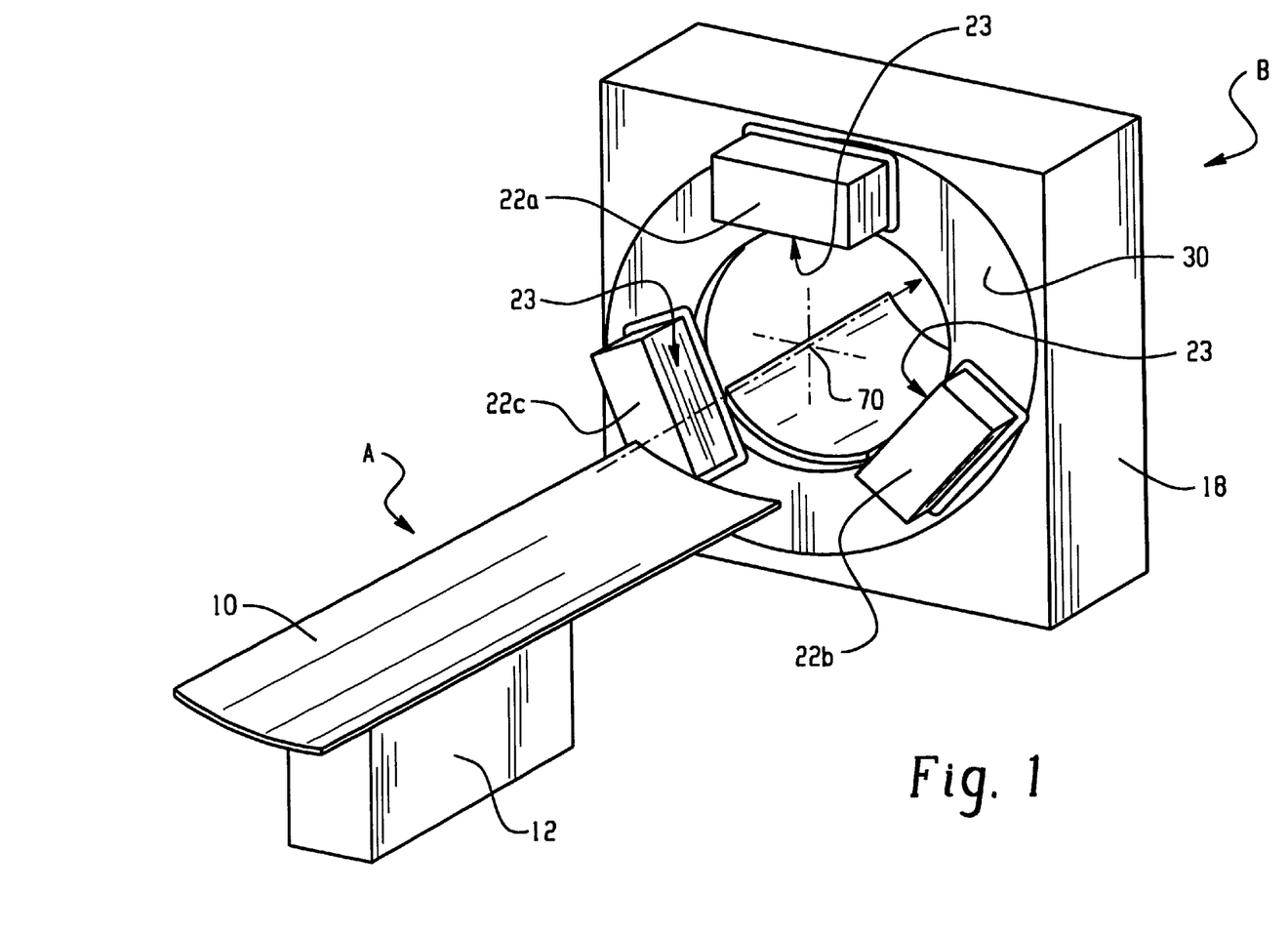
FIG. 1 is a diagrammatic illustration depicting an exemplary nuclear imaging apparatus in accordance with aspects of the present invention.

With reference to FIG. 1, an object being imaged or studied, such as a patient, is supported on a couch or support A. Preferably, one or more radiopharmaceuticals or radioisotopes capable of generating emission radiation have been introduced into the object. The support A preferably includes a thin, relatively radiation transmissive support surface 10 which is mounted cantilevered from a base 12. The base 12 optionally includes motors (not shown) for raising and lowering the support surface 10 and for extending and retracting the support surface 10 in a longitudinal direction (i.e., parallel to axis 70) relative to a nuclear camera gantry B. Alternately, relative longitudinal motion may be achieved by moving the gantry B in the longitudinal direction.

The gantry B includes stationary and rotating gantry portions 18 and 30, respectively. Detector heads 22a, 22b and 22c are mounted to the rotating gantry portion 30 that defines a receiving region or aperture into which the object being studied or anatomy of interest may be inserted. Each detector head 22 preferably includes: a radiation receiving side or face 23 that faces the object in the receiving region; and a housing about the other detector head faces that is fabricated from a radiation attenuative material, such as lead, for example. The detector heads 22 are adjustably mounted to the rotating gantry which rotates about the central axis 70 extending longitudinally through the receiving region or aperture. The detector heads 22 are preferably adjustable radially toward and away from the aperture, and tangentially with respect to the aperture. The relative angular positions of the detectors 22 about the aperture may also be adjusted or varied. As the gantry 30 rotates about the axis 70, the rotating detector heads 22 define a generally circular trajectory, the precise shape of which may vary as the detector heads 22 are adjusted radially or tangentially during rotation of the gantry 30. In operation, the detector heads 22 are preferably rotated or indexed around the object to monitor radiation from a plurality of directions to obtain a plurality of different angular views. As is known in the art, radiation data is collected as the detector heads 22 are rotated about the aperture. The data represents radiation incident on the radiation receiving face 23 of each detector head 22 having various angular views of the object which change as the rotating gantry 30 rotates. Ultimately, the data is used to generate an image indicative of the detected radiation from the radiopharmaceuticals or radioisotopes introduced into the object.

While described above as having three detector heads 22, greater (e.g., four or more) or fewer (e.g., 1 or 2) numbers may be used. It is not necessary that the detector heads 22 be disposed at equal angular intervals about the aperture; a variety of different configurations may be implemented. It is also not necessary that the detector heads 22 be moved with respect to or rotated about the object; relative motion may be provided by moving the object with respect to the detector heads 22.

Those skilled in the art will recognize that the apparatus configuration shown in FIG. 1 is exemplary of a configuration which provides a number of degrees of freedom of course, other suitable detector head, support and gantry configurations may be implemented, provided that the desired relative motion (if any) between the detector head(s) and the object or between the detector heads themselves may be achieved.

Figure 2A:
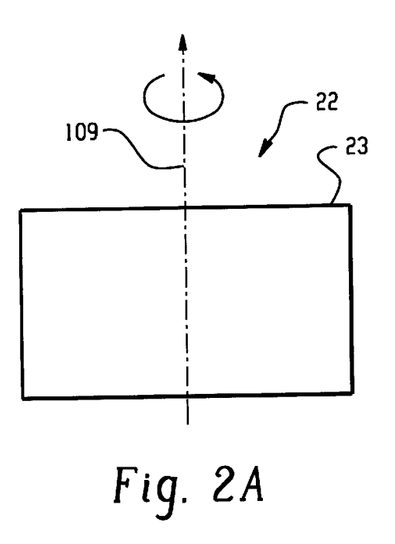
FIGS. 2A and 2B are diagrammatic illustrations depicting side views of alternative detectors heads in accordance with aspects of the present invention.
Figure 2B:
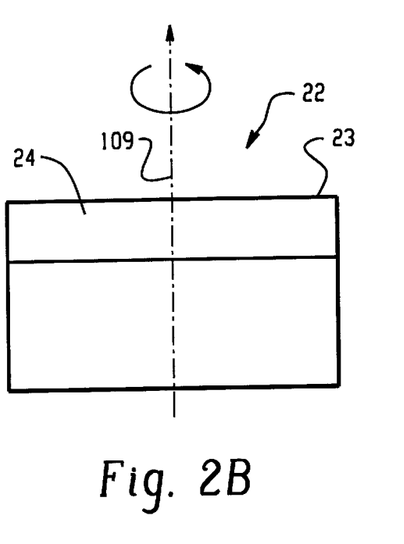

With further reference to FIGS. 2A and 2B, in a preferred embodiment, the radiation receiving side or face 23 of the detector head 22 rotates about a preferably central axis 109 which is oriented perpendicular to the radiation receiving side or face 23 of the detector head 22. Preferably, the entire detector head 22 rotates about the axis 109. Alternately, each detector head 22 includes a rotating detector portion 24 which rotates about the central axis 109. The rotating detector portion 24 is preferably on the side of the detector head 22 proximal to the object or receiving region so that the radiation receiving face 23 of the detector head 22 rotates about the axis 109. In any event, on the side of the detector head 22 that faces the object or receiving region, preferably one or more radiation detecting segments or elements 106a, 106b, . . . 106n are arranged to rotate with the detector head 22 or the rotating portion 24 thereof.

Figure 3:
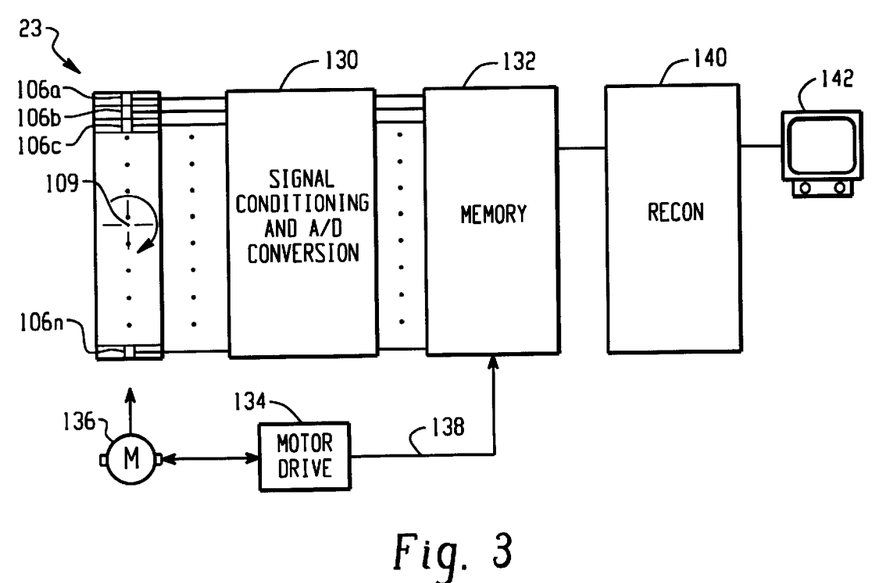
FIG. 3 is a diagrammatic illustration depicting the functional relationship between data conditioning and processing elements in accordance with aspects of the present invention and a detector head of the nuclear imaging apparatus of FIG. 1.

With further reference to FIG. 3, signals from the detector elements 106a, 106b, . . . 106n of each detector head 22 are preferably received by signal conditioning and analog to digital conversion circuitry 130 and stored in a memory 132. A motor drive 134 drives a motor 136 which causes the radiation receiving face 23 to rotate about the preferably central axis 109 perpendicular thereto. A signal 138 indicative of the rotational or angular position of the rotating radiation receiving face 23 is provided to the memory 132, and the data from the detector elements 106 is stored accordingly therein.

Alternately, the detector face 23 is rotated about the axis 109 continuously as radiation data is collected, or data is collected with the detector face 23 being rotatably located or indexed about the axis 109 at a plurality of discrete angular positions. In either case, accessing the memory 132, a reconstruction processor 140 reconstructs the data into image representations for display in human readable form on a display device 142 such as a monitor, film, or the like.

In a preferred embodiment, the data may be reconstructed by the reconstruction processor 140 using a two step process. First, the data received by the detector elements 106 at each of a plurality of positions about the axis 109 is reconstructed to create a two-dimensional data set analogous to the data generated by a conventional camera, e.g., an Anger camera. Second, the two dimensional data sets obtained at a plurality of positions about the axis 70 may in turn be reconstructed so as to create volumetric image data. Alternately, the data may be reconstructed using a single step process whereby the data received by the detector elements 106 at each of a plurality of positions about the axis 109 and the axis 70 are reconstructed directly to form the volumetric image data.

Figure 4:
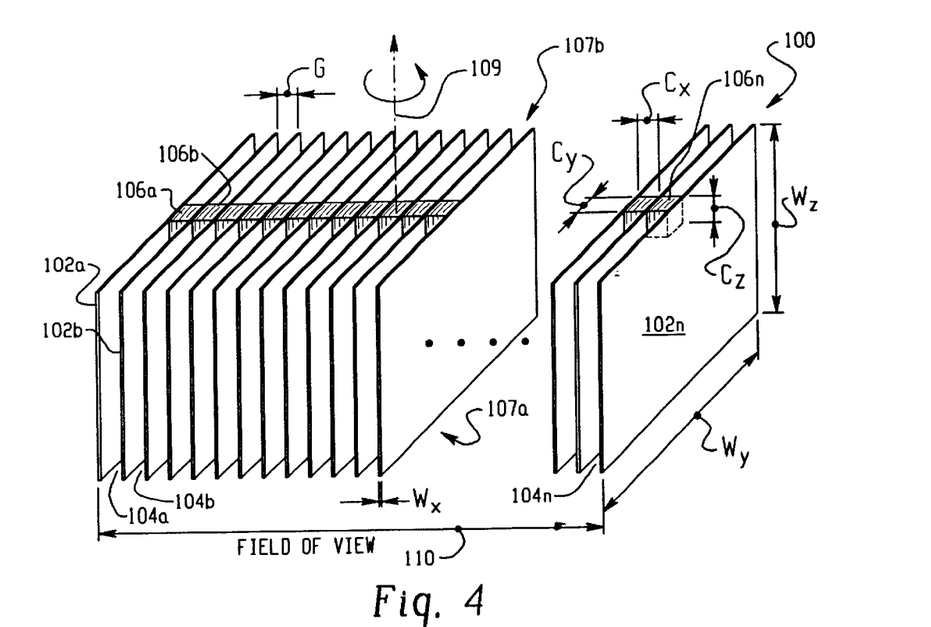
FIG. 4 is a diagrammatic illustration depicting a perspective view of a 1D slat-collimator in accordance with aspects of the present invention.

With further reference to FIG. 4, interposed between the object and the detector head 22, a one dimensional slat collimator 100 is arranged on the rotating radiation receiving face 23 of each detector head 22. The collimator 100 preferably includes a plurality of generally rectangular shaped spaced apart septa or slats 102a, 102b, . . . 102n which are constructed or fabricated from a radiation attenuative material. In a preferred embodiment, the slats 102 are fabricated from tungsten, although other materials providing suitable attenuation may be used.

Figure 5A:
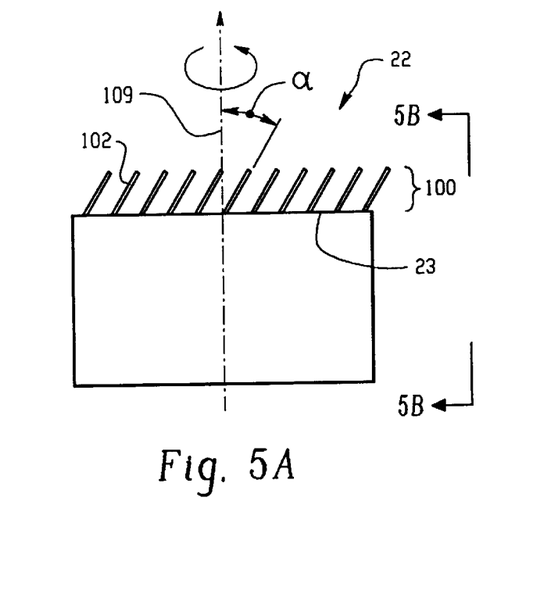
FIG. 5A is diagrammatic illustration of a side view of a detector head assembly including the 1D slat-collimator of FIG. 4 in accordance with aspects of the present invention.
Figure 5B:
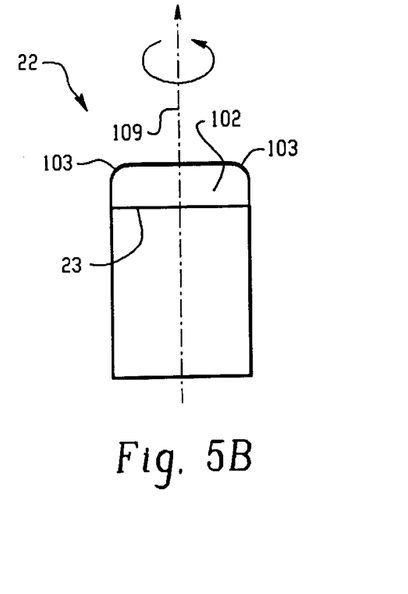
FIG. 5B is a diagrammatic illustration of an end view of the detector head assembly of FIG. 5A taken along section line 5B—5B.

In a preferred embodiment, the two opposing corners 103 of the slats 102 proximal the object or receiving region are rounded (best seen in FIG. 5B). The rounded corners 103 preferably have a radius of curvature approximately equal to the slats' height $W_Z$, e.g., 5 cm. By smoothing out the corners in this manner, changes in resolution which are slat height and/or width dependant can also be smoothed out.

The spacing between the slats 102 defines a plurality of slits or gaps 104a, 104b, . . . 104n having a width G. Each septum has a height $W_z$ which is defined by a distance that the septum extends out from the face 23, a longitudinal or transverse dimension $W_y$ which is defined by the long dimension of the generally rectangular septum, and a thickness $W_x$ which is relatively small compared to G, $W_z$ and/or $W_y$. A front edge 107a of the slats 102 faces the receive region and a back edge 107b is proximal the radiation receiving face 23 of the detector head 22. Where the slats 102 are parallel to one another, the field of view 110 (FOV) in the direction transverse to the orientation of the slats 102 corresponds to the number of slats 102 multiplied by their spacing.

In a preferred embodiment, each radiation sensitive detector element 106a, 106b, . . . 106n is disposed or arranged so as to detect radiation received in each of the respective gaps 104a, 104b, . . . 104n. Optionally, each of the detector segments or elements 106a, 106b, . . . 106n has a transverse dimension $C_y$, a thickness $C_x$, and a height $C_z$. The detector elements 106a, 106b, . . . 106n are preferably centered about the midpoint of the transverse dimension $W_y$ of the slats 102, although they may be offset therefrom. In one embodiment, the detector elements 106a, 106b, . . . 106n are fabricated from scintillating materials such as cesium iodide (CsI) or sodium iodide (NaI) in optical communication with a photo diode or other appropriate photodetector. A semiconductor detector material such as cadmium zinc telluride (CdZnTe) may also be used. Depending on the requirements of a particular application, other materials such as silicon (Si), germanium (Ge), cadmium telluride (CdTe), $HgI_2$, gallium arsenide (GaAs), bismuth sulphate ($Bi_2S_3$), $Pb_{L2}$, GaSe, AlSb or CdSe may also be used.

In one preferred embodiment, the dimension $C_y$ is less than $W_y$. That is, the generally rectangular slats 102 extend in their long dimension $W_y$ beyond an outer dimension $C_y$ of the radiation receiving face 23. Alternately, the transverse dimension $C_y$ of the detector segments 106a, 106b, . . . 106n is substantially the same as the transverse dimension $W_Y$ of the slats 102. Moreover, in another alternate embodiment, the plurality of detector segments 106a, 106b, . . . 106n are replaced by a single detector element which spans across all the collimator slats 102 or fewer detector elements which each span multiple collimator slats 102. In the case of a single detector element or of detector elements spanning multiple slats 102, the active areas of each element located in the gaps 104 between adjacent slats 102 are separately sampled when collecting or acquiring the radiation data.

Figure 5C:
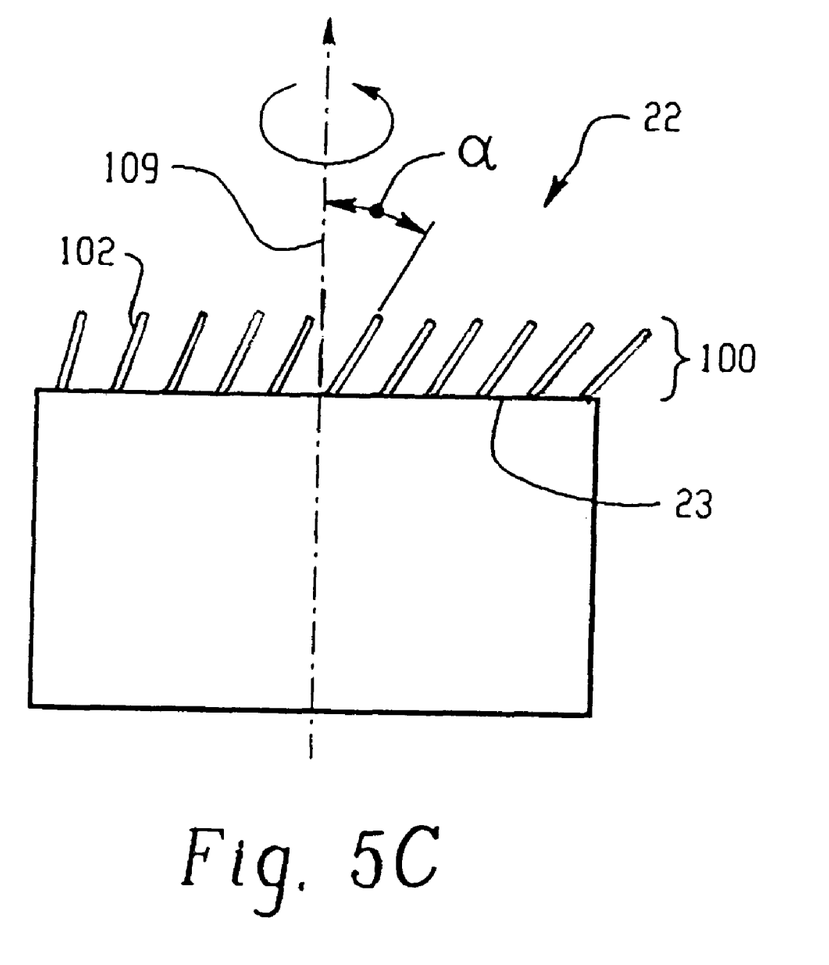
FIG. 5C is a diagrammatic illustration of a side view of a detector head assembly including a 1D slat-collimator with slats having a progressively changing degree of tilt in accordance with aspects of the present invention.

As best seen in FIG. 5A, the slats 102 are tilted at an angle a greater than zero with respect to the axis 109. While the slats 102 are preferably parallel to one another (as shown in FIG. 5A), they optionally have a progressively changing degree of tilt (i.e., a so called one dimensional fan beam configuration, as shown in FIG. 5C). The angle a is optionally adjustable. In a preferred embodiment, the angle α is chosen to be inversely proportional to the camera=s resolution or a desired imaging resolution. Preferably, the angle α is greater than zero degrees and less than or equal to 5 degrees. More preferably, the angle α is equal to approximately 0.25 degrees. By tilting the slats 102 in this manner, the 1/r weighting factor or dependence discussed in the background above can be accounted for in the reconstruction as discussed below. In particular, the 1/r weighting factor, while initially modeled in the reconstruction solution, is caused to fall out through cancellation.

Figure 6:
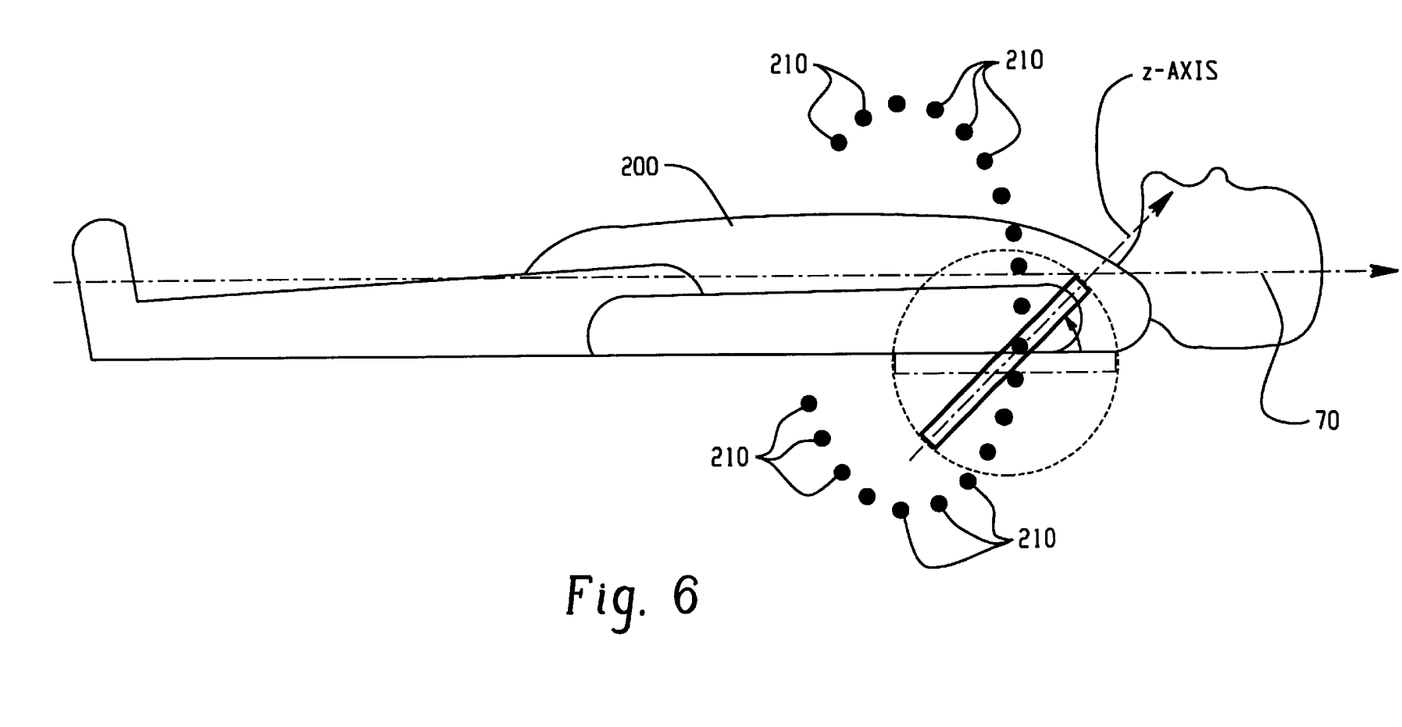
FIG. 6 is a diagrammatic illustration of data acquisition using the nuclear imaging apparatus of FIG. 1 in accordance with aspects of the present invention.

An exemplary data acquisition for a three-dimensional (3D) tomographic image reconstruction is now discussed with further reference to FIG. 6. In a preferred embodiment, the relative motion of the radiation receiving face 23 of each detector head 22 is decomposed into two parts. Part one of the decomposed motion is achieved via rotation of the rotating gantry 30 such that the centroid of each detector is rotated or indexed about the axis 70 and hence the object, represented here by a patient 200. A plurality of exemplary angular centroid positions are indicated by reference numeral 210. At each centroid position 210, a "SPECT-view" of the patient 200 is obtained. Each SPECT-view can be defined by the relative angular centroid position 210 about the axis 70, nominally termed the SPECT-angle. Preferably, for 3D image reconstruction 180 degrees of SPECT-views are collected or acquired.

For part two of the decomposed motion, at each SPECT-angle, the radiation receiving face 23 of the detector head 22 is rotated or indexed about its central perpendicular axis 109 via motor 136. Preferably, the face 23 is rotated 360 degrees to generate what is know in the art as a sinogram. The sinogram is the measured projection data arranged in a matrix where the horizontal axis represents the linear position of the projection data along the direction of the FOV 110, and the vertical axis represents a spin angle $\phi$ of the face 23 about the axis 109. At each spin angle $\phi$, the data generated is a one-dimensional vector of 1/r weighted plane integral values.

The reconstruction processor 140 then carries out an appropriate image reconstruction using a modified Radon transformation. A traditional Radon transformation, as is known in the art, takes the second order derivative of the measured data one-dimensionally, then backprojects the processed data three-dimensionally. At each SPECT-view, the modified Radon transformation employed herein uses as an approximation for the first derivative, the difference between sinogram data obtained at spin angles $\phi$ displaced 180 degrees apart. The second derivative is evaluated by taking the derivative of the forgoing difference. The second derivative can then be backprojected to obtain the 3D image reconstruction.

Figure 7A:
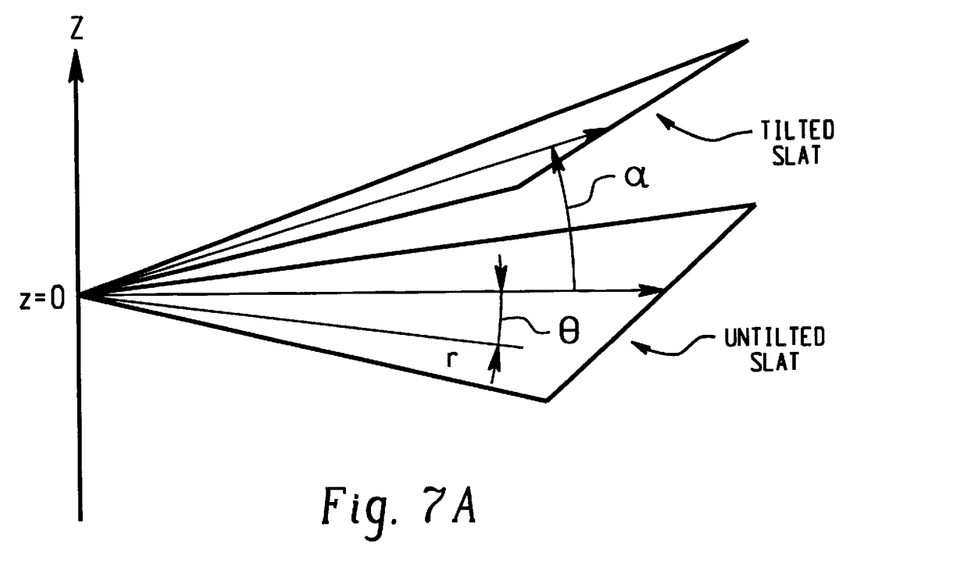
FIG. 7A is a diagrammatic illustration depicting an exemplary reconstruction coordinate system in accordance with aspects of the present invention; and, FIGS. 7B and 7C are diagrammatic illustrations depicting the tilt of collimator slats at 180 degree opposing spin angles of a radiation receiving face of a detector head in accordance with aspects of the present invention.

More specifically, with further reference to FIG. 7A, the mathematical support for image reconstruction in accordance with aspects of the present invention is now discussed. For exemplary purposes herein, the object being imaged is expressed in a cylindrical coordinate system as the function f(r, $\theta$, z), where the z-axis is a central axis on the detector's radiation receiving face 23 running in the direction of the FOV 110. Without loss of generality, one detection cell (e.g., one radiation detecting element 106) at z=0 is considered.

Figure 7B:
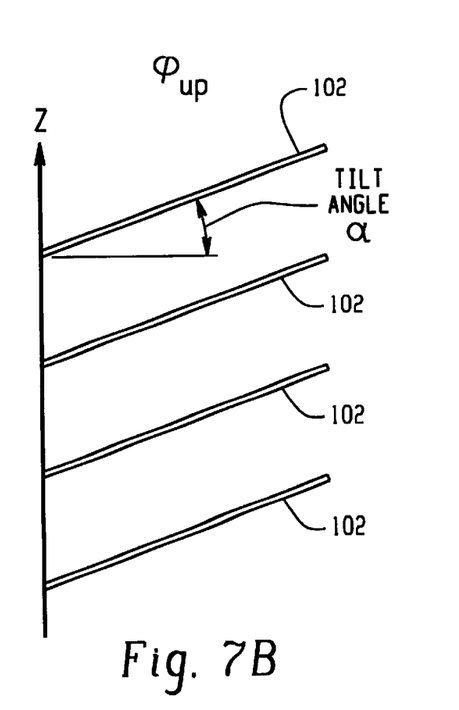

At a first spin angle $\phi_{up}$ where the slats are tilted nominally "up" by an angle $\alpha$ with respect to the axis 109 (see FIG. 7B), the measured 1/r weighted planar integral is given by:

$$g_{up} = \int\int \frac{1}{r} f(r, \theta, r\tan(\alpha)) r dr d\theta. \tag{1}$$

Figure 7C:
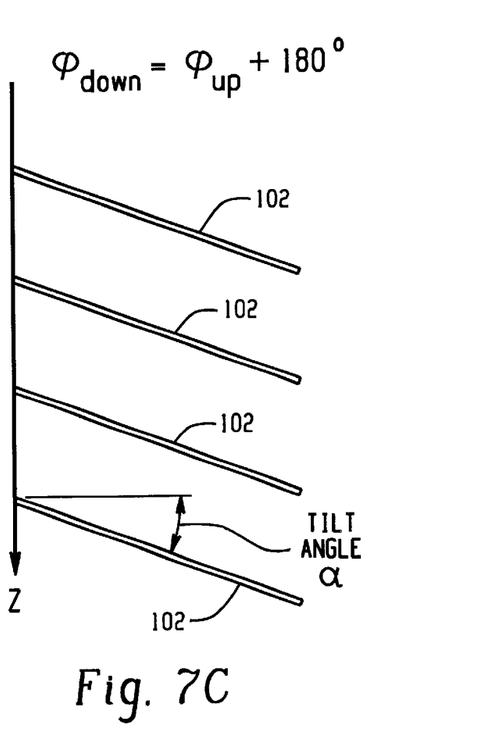

At second spin angle $\phi_{down}$ displaced from $\phi_{up}$ by 180 degrees, the slats 102 are tilted by $\alpha$ with respect to the axis 109 in exactly the opposite direction (i.e., nominally "down") relative to their tilt at the first spin angle (see FIG. 7C), and the measured 1/r weighted planar integral is given by:

$$g_{down} = \int\int \frac{1}{r} f(r, \theta, -r\tan(\alpha)) r dr d\theta. \tag{2}$$

Evaluating the difference between the two measurements represented by equations (1) and (2) gives:

$$g_{up} - g_{down} = 2\tan(\alpha) \int\int \frac{f(r, \theta, r\tan(\alpha)) - f(r, \theta, -r\tan(\alpha))}{2(r\tan(\alpha))} r dr d\theta. \tag{3}$$

Thus, if $\alpha$ is sufficiently small, equation (3) can be approximated by or rewritten as:

$$g_{up} - g_{down} = 2\tan(\alpha) \int\int f_z'(r,\theta,0) r dr d\theta \tag{4};$$

or equivalently, in an x, y, z Cartesian coordinate system, equation (4) is given by:

$$g(z) = g_{up}(z) - g_{down}(z) = 2\tan(\alpha) \int\int f_z'(x,y,0) dx dy \tag{5}.$$

In this manner, while originally modeled and/or accounted for in the measurements, the 1/r weighting factor has been eliminated or canceled out, and the resulting function g(z) is the derivative of the regular planar integral.

It is to be understood that the tilt angle $\alpha$ should be large enough that the sinogram measurements obtained at 180 degree opposing spin angles $\phi_{down}$ and $\phi_{up}$ can be differentiated, that is $g_{up}-g_{down}$ should not equal 0. Additionally, $\alpha$ should be small enough that the approximation leading from equation (3) to equation (4) is reasonably accurate, i.e., the difference, $g_{up}-g_{down}$, can reasonably be assumed to be the derivative of the sinogram vector in the direction of the z-axis.

Next, g'(z), i.e., the derivative of g(z), is evaluated. Optionally, g'(z) is evaluated using the following relationship:

$$g'(z+0.5) \approx g(z+1) - g(z) \tag{6}.$$

Finally, the 3D image can then be reconstructed by backprojecting g'(z). In a preferred embodiment, at each SPECT-view, g'(z) is backprojected two-dimensionally to form a 2D intermediate "projection" image $P_\Theta$, where $\Theta$ is the index representing the SPECT-angle of the 2D intermediate projection image P. Optionally, each backprojection of g'(z) is weighted by a sin($\beta$) function, where $\beta$ is the relative angle between the axis 70 (i.e., the SPECT-axis) and the spin angles at which the respective g'(z) is evaluated. This reduces undesirable oversampling which would otherwise occur when the rotating z-axis of the radiation receiving face 23 of the detector head 22 is near parallel with the SPECT-axis. When indexing the face 23 about the axis 109, the sin($\beta$) weighting may be accomplished by progressively increasing the sampling angle as the z-axis nears parallel with the SPECT-axis. Alternately, when continuously rotating the face 23 about the axis 109, the sin($\beta$) weighting may be achieved by progressively reducing the acquisition time as the z-axis nears parallel with the SPECT-axis.

In any event, each $P_\Theta$ is preferably treated as 2D parallel-beam projection data at the SPECT-angle $\Theta$. Accordingly, $P_\Theta$ may in turn be backprojected two-dimensionally slice-by-slice. Thereafter, to obtain the final 3D image volume, the 2D slices a stacked in order adjacent one another.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A rotating laminar emission camera comprising:
   a detector having a side which detects radiation facing an object being studied, said detector rotating about an axis perpendicular to the side of the detector facing the object;
   a collimator constructed of a radiation attenuative material arranged on the side of the detector facing the object, said collimator including a plurality of spaced apart slats, each of said slats being tilted at an angle greater than zero with respect to the axis, and all of said slats tilting away from the axis toward a same side thereof; and,
   a data processor which subtracts data obtain from the detector at a first angular orientation about the axis from data obtained from the detector at a second angular orientation about the axis, said first and second angular orientations being displaced from one another by 180 degrees.

2. The rotating laminar emission camera of claim 1, wherein the angle is inversely proportional to the camera's resolution.

3. The rotating laminar emission camera of claim 1, wherein the angle is greater than zero degrees and less than or equal to 5 degrees.

4. The rotating laminar emission camera of claim 1, wherein the angle is approximately 0.25 degrees.

5. The rotating laminar emission camera of claim 1, wherein the slats extend longitudinally beyond an outer dimension of the side of the detector facing the object.

6. The rotating laminar emission camera of claim 1, wherein the detector comprises:
   a plurality of detector segments which are arranged to be visible through the slats of the collimator such that each detector segment detects radiation received through a respective gap formed by adjacent slats.

7. The rotating laminar emission camera of claim 6, wherein the slats extend longitudinally beyond an outer dimension of the detector segments.

8. The rotating laminar emission camera of claim 1, wherein the slats are parallel to one another.

9. A rotating laminar emission camera comprising:
   a detector having a side which detects radiation facing an object being studied, said detector rotating about an axis perpendicular to the side of the detector facing the object; and,
   a collimator constructed of a radiation attenuative material arranged on the side of the detector facing the object, said collimator including a plurality of spaced apart slats, each of said slats being tilted at an angle greater than zero with respect to the axis, and all of said slats tilting away from the axis toward a same side thereof;
   wherein the slats are thin rectangular members with two rounded corners at opposing longitudinal ends of each slat, said two rounded corners being opposite an edge of the slats proximal to the side of the detector facing the object.

10. The rotating laminar emission camera of claim 9, wherein the two rounded corners have a radius of curvature approximately equal to a height of the slats, said height of the slats being defined by a distance that the slats extend outwardly from the side of the detector facing the object.

11. A rotating laminar emission camera comprising:
    a detector having a side which detects radiation facing an object being studied, said detector rotating about an axis perpendicular to the side of the detector facing the object; and,
    a collimator constructed of a radiation attenuative material arranged on the side of the detector facing the object, said collimator including a plurality of spaced apart slats, each of said slats being tilted at an angle greater than zero with respect to the axis, wherein the angle progressively changes for each slat, and all of said slats tilt away from the axis toward a same side thereof.

12. A nuclear medical imaging apparatus comprising:
    a receiving region wherein an object being imaged is received;
    a radiation detector having a side which faces the receiving region, said detector including;
       a collimator fabricated from radiation attenuative material arranged on the detector between the detector and the receiving region, said collimator including a plurality of spaced apart slats which are tilted at an angle greater than zero with respect to a central axis perpendicular to the side of the detector which faces the receiving region;
    a drive which imparts about the central axis relative rotation between the detector and the object being imaged; and,
    a data processor which subtracts data obtain from the radiation detector at a first angular orientation about the central axis from data obtained from the radiation detector at a second angular orientation about the central axis, said first and second angular orientations being displaced from one another by 180 degrees.

13. The nuclear medical imaging apparatus according to claim 12, further comprising:
    image reconstruction means employing a Radon transformation to reconstruct an image representation of the object from the data obtained from the radiation detector, said image reconstruction means approximating a first derivative of the Radon transformation with the subtracted data output by the data processor.

14. The nuclear medical imaging apparatus according to claim 12, wherein the slats are thin rectangular members with two rounded corners at opposing longitudinal ends of each slat, said two rounded corner being opposite an edge of the slats proximal to the side of the detector facing the receiving region.

15. The nuclear medical imaging apparatus according to claim 12, wherein the slats extend beyond an outer dimension of the side of the detector which faces the receiving region.

16. The nuclear medical imaging apparatus according to claim 12, wherein the radiation detector comprises:
    a plurality of detector segments which are arranged between the slats of the collimator such that each detector segment detects radiation received through a respective gap formed by adjacent slats.

17. A method of nuclear medical imaging comprising:
    (a) exposing a side of a radiation detector to an object being imaged, wherein a direction the detector is facing is defined by an axis perpendicular to the side of the detector;
    (b) varying about the axis a relative rotational orientation between the object and the detector;

(c) obtaining a first data set based on radiation detected by the detector at a first relative rotational orientation between the object and the detector;

(d) obtaining a second data set based on radiation detected by the detector at a second relative rotational orientation between the object and the detector, said second relative rotational orientation being displaced from the first relative rotational orientation; and, (e) subtracting the second data set from the first data set to determine a difference between the first and second data sets.

18. The method of nuclear medical imaging according to claim 17, wherein the first and second relative rotational orientations are displaced from one another by 180 degrees.

19. The method of nuclear medical imaging according to claim 17, wherein the difference obtained in step (e) is used as an approximation of a first derivative of a Radon transformation.

20. A method of nuclear medical imaging comprising:

(a) exposing a side of a radiation detector to an object being imaged, wherein a direction the detector is facing is defined by an axis perpendicular to the side of the detector;

(b) varying about the axis a relative rotational orientation between the object and the detector;

(c) collimating radiation received by the detector such that radiation received by the detector is substantially limited along one direction to a reception trajectory having an angle greater than zero with respect to the axis;

(d) obtaining a first data set based on radiation detected by the detector at a first relative rotational orientation between the object and the detector;

(e) obtaining a second data set based on radiation detected by the detector at a second relative rotational orientation between the object and the detector, said first and second relative rotational orientations being displayed displaced from one another by 180 degrees; and, (f) subtracting one of the first and second data sets from the other to determine a difference between the first and second data sets.

21. The method of nuclear medical imaging according to claim 20, further comprising:

(g) taking a derivative of the difference obtained in step (f); and, (h) backprojecting the derivative of the difference.

22. The method of nuclear medical imaging according to claim 20, wherein the first and second data sets represent 1/r weighted planar integrals, where r represents a distance from a detected radiation event to the detector.

23. The method of nuclear medical imaging according to claim 20, wherein the first and second data sets are obtained in such a manner that the 1/r weighting factor becomes negligible in step (f).

* * * * *